United States Patent [19]

Kita

[11] 4,077,734

[45] Mar. 7, 1978

[54] INSERT FOR MINING TOOLS AND THE LIKE

[75] Inventor: John F. Kita, Bedford, Pa.

[73] Assignee: Kennametal Inc., Latrobe, Pa.

[21] Appl. No.: 700,876

[22] Filed: Jun. 29, 1976

[51] Int. Cl.² .................. B26D 1/00; E21C 13/00
[52] U.S. Cl. .................. 407/66; 175/410; 407/120
[58] Field of Search .............. 29/95, 96, 103, 105; 175/410, 409, 413; 299/91, 94

[56] References Cited

U.S. PATENT DOCUMENTS

| 3,442,342 | 5/1969 | McElya et al. | 175/410 X |
| 3,495,668 | 2/1970 | Schumacher, Jr. | 175/410 X |
| 3,603,414 | 9/1971 | Stebley | 175/410 X |
| 3,807,804 | 4/1974 | Kniff | 299/91 |

Primary Examiner—Harrison L. Hinson
Attorney, Agent, or Firm—Lawrence R. Burns

[57] ABSTRACT

An insert, especially a hard wear resistant insert, such as an insert of cemented hard metal carbide, for use in a mining tool or the like. The insert is especially adapted for being press fitted into the body of a mining tool or the like but may also be brazed or cemented therein. The insert has a rounded outer end and a flat inner end and tapers inwardly immediately adjacent the flat inner end and is rounded at the periphery of the flat inner end thereby eliminating stress risers in the insert and providing for easier insertion thereof into a bore in a tool body into which the insert is seated.

5 Claims, 3 Drawing Figures

INSERT FOR MINING TOOLS AND THE LIKE

The present invention relates to hard wear resistant inserts, especially adapted for use in mining tools or the like, in which the inserts are mounted to resist impact and abrasion.

It is well known to provide the regions of mining tools and the like which are subjected to wear and abrasion and impact with hard wear resistant characteristics which are often obtained by drilling holes in the body of the tool and inserting rods or inserts of hard wear resistant material therein formed of, for example, cemented hard metal carbides such as cemented tungsten carbide.

The inserts in at least some of the tools are subjected to considerable impact forces. In down-the-hole hammers, for example, the bit which carries the inserts is impacted strongly in order to reduce rock formations and the like on which the bit rests. For this reason, the insert must be extremely firmly mounted in the tool body so that it does not become loose or shift therein under working conditions.

With the foregoing in mind, the primary objective of the present invention is the provision of an insert configuration and a method of mounting the insert in a tool body which eliminates the shifting or loosening of the insert in the tool body under working conditions and, furthermore, eliminates any regions of extremely high stress in the insert due to seating it in the body.

BRIEF SUMMARY OF THE INVENTION

According to the present invention, a rodlike element of hard wear resistant material, such as cemented hard metal carbide; in particular, cemented tungsten carbide, is formed and is adapted for insertion in a steel tool body to provide the tool body with abrasion and wear resistant characteristics.

The insert, when mounted in a tool body, protrudes from the tool body at the outer end of the insert and, preferably, stops at the other end against an outwardly facing surface on the tool body. The outer end of the insert is preferably rounded while the inner end, according to the present invention, has a flat surface perpendicular to the axis of the tool body, a rounded periphery on the flat end, and a tapered portion leading from the curved periphery of the flat end to the cylindrical envelope of the body.

The hole in the tool body for receiving the insert is preferably drilled and then reamed approximately to size and is then shot peened to densify the surface which will engage the insert. The insert is then press fitted into the hole until the flat end of the insert comes to rest on the bottom of the hole. Advantageously, the hole is exactly configured to be complimentary in configuration to the insert and the rounded peripheral region is seated against the material of the tool body.

The rounded periphery at the flat end of the insert and the tapered portion leading from the envelope of the insert up to the rounded portion provides a pilot region which will assist in guiding the insert into the hole when it is seated therein and, furthermore, prevents the surface of the hole from being scratched or deformed and prevents the insert from taking any chips or shavings from the tool body as the insert is being pressed into the hole. Thus, the tapered region can serve even further to densify the material of the body immediately surrounding the insert and to enhance the support provided for the insert by the body.

The exact nature of the present invention will become more clearly apparent upon reference to the following detailed specification taken in connection with the accompanying drawings in which.

DETAILED DESCRIPTION OF THE INVENTION

Figure 1:
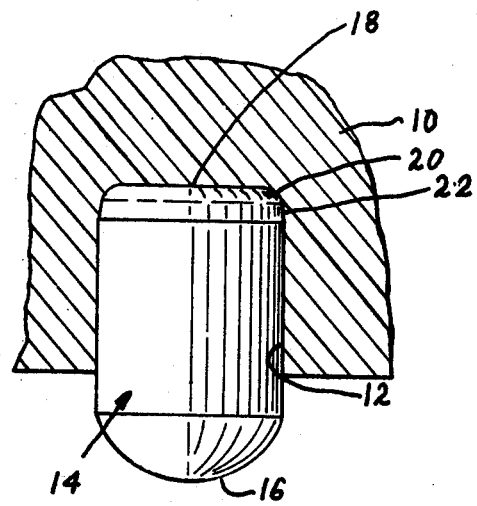
FIG. 1 is a fragmentary sectional view showing an insert according to the present invention mounted in a tool body.

Referring to the drawings somewhat more in detail, in FIG. 1, the tool body in which the insert is mounted is indicated at 10. It will be understood that the body 10 could have a plurality of inserts mounted therein in distributed relation, but the single insert illustrated is ample to disclose the present invention. The body 12 is provided with a hole 12 therein for receiving insert 14 which is advantageously press fitted into hole 12. Hole 12 is preferably drilled, reamed and shot peened and conforms more or less exactly to the configuration of the insert 14.

The outer end of the insert 14 has a rounded or outwardly convex surface 16 while the inner end of the insert has a flat surface 18 disposed in a plane perpendicular to the longitudinal axis of the insert.

Figure 2:
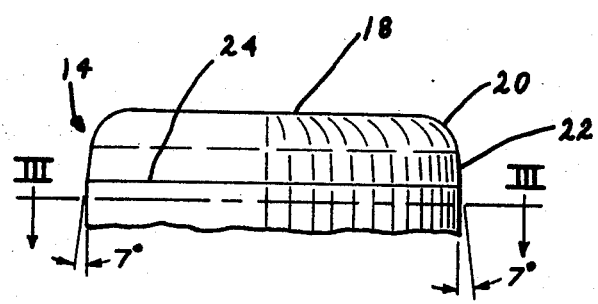
FIG. 2 is a fragmentary view of the inner end of the insert drawn at enlarged scale.
Figure 3:
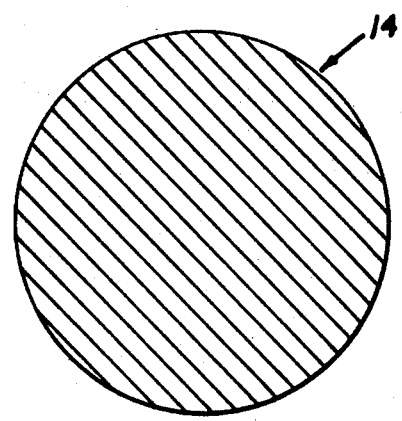
FIG. 3 is a cross sectional view indicated by line III—III on FIG. 2.

As will best be seen in FIG. 2, flat surface 18 terminates at the periphery in a rounded region 20 which is somewhat smaller in diameter than the main body portion of the insert. Between the main body portion of the insert and the rounded portion 20 is a tapered region 22 which may be formed so as to be tangential to the rounded portion 20 while intersecting the body portion of insert 14 in the region indicated by line 24, in FIGS. 1 and 2. There is advantageously a fillet at the juncture of the tapered portion 22 with the body of the insert to prevent the establishing of a stress riser.

Tapered region 22 may, as shown, taper inwardly toward the inner end of the insert at an angle of about 7 degrees to the longitudinal axis of insert 18.

The tapered region 22 provides a pilot portion on the insert so that, when the insert is press fitted into a hole, it will be guided therein and the insert will present no sharp corners to take shavings out of the hole and thereby obstruct the seating of the insert on the bottom of the hole. The common practice of providing a chamfer on the insert end of the insert forms the possibility of taking such chips and interfering with the seating of the insert.

Furthermore, a chamfer on the inner end of the insert presents the possibility of the corner of the insert at the larger diameter of the chamfer digging into the side of the hole and causing the insert to tilt thereon, thus, interfering with the pressing in place of the insert. Such problems are eliminated by the inner end configuration according to the present invention.

Still further, the inner end configuration according to the present invention eliminates stress risers in the insert so that, once the insert is seated in the body of the tool, as shown in FIG. 1, it is free of regions of extremely high stress that could lead to premature breaking or fracturing of the insert.

Modifications may be made within the scope of the appended claims.

What is claimed is:

1. An insert, especially for insertion into a blind hole in the body of a mining tool or the like and comprising; a rod-like element having a central longitudinal axis and formed of hard wear resistant material, said insert being substantially cylindrical between the ends thereof and flat on one end and rounded on the other end, said insert adapted for insertion into the hole in the body flat end foremost and with the rounded end protruding from the body, said insert having an axial region near said flat end which tapers inwardly at a predetermined angle toward said flat end, and a rounded peripheral seating region of a predetermined size joining the tapered region to said flat end.

2. An insert according to claim 1 in which said tapered region tapers inwardly from the longitudinal central axis of the insert at a rate of about 7 degrees.

3. An insert according to claim 1 which includes a fillet at the juncture of said tapered region and the cylindrical part of the insert.

4. An insert according to claim 2 in which said hard wear resistant material comprises a cemented hard metal carbide material.

5. A mining tool having a compact of hard wear resistant material inserted therein and comprising; a blind hole formed in the body of said mining tool, a rod-like element having a central longitudinal axis and formed of hard wear resistant material and being substantially cylindrical between the ends thereof, said rod-like element having a flat on one end and rounded on the other end, said rod-like element adapted for insertion in the hole in the body flat end foremost and with the rounded end protruding from the body, said rod-like element having an axial region near said flat end which tapers inwardly at a predetermined angle toward said flat end and a rounded peripheral region of a predetermined size joining the tapered region to said flat end, said blind hole conforming in shape so as to seat and support the rod-like element on portions of said flat end and said rounded peripheral region.

* * * * *